No. 844,590. PATENTED FEB. 19, 1907.
C. F. HALDEMAN.
SAW TABLE.
APPLICATION FILED OCT. 19, 1906.
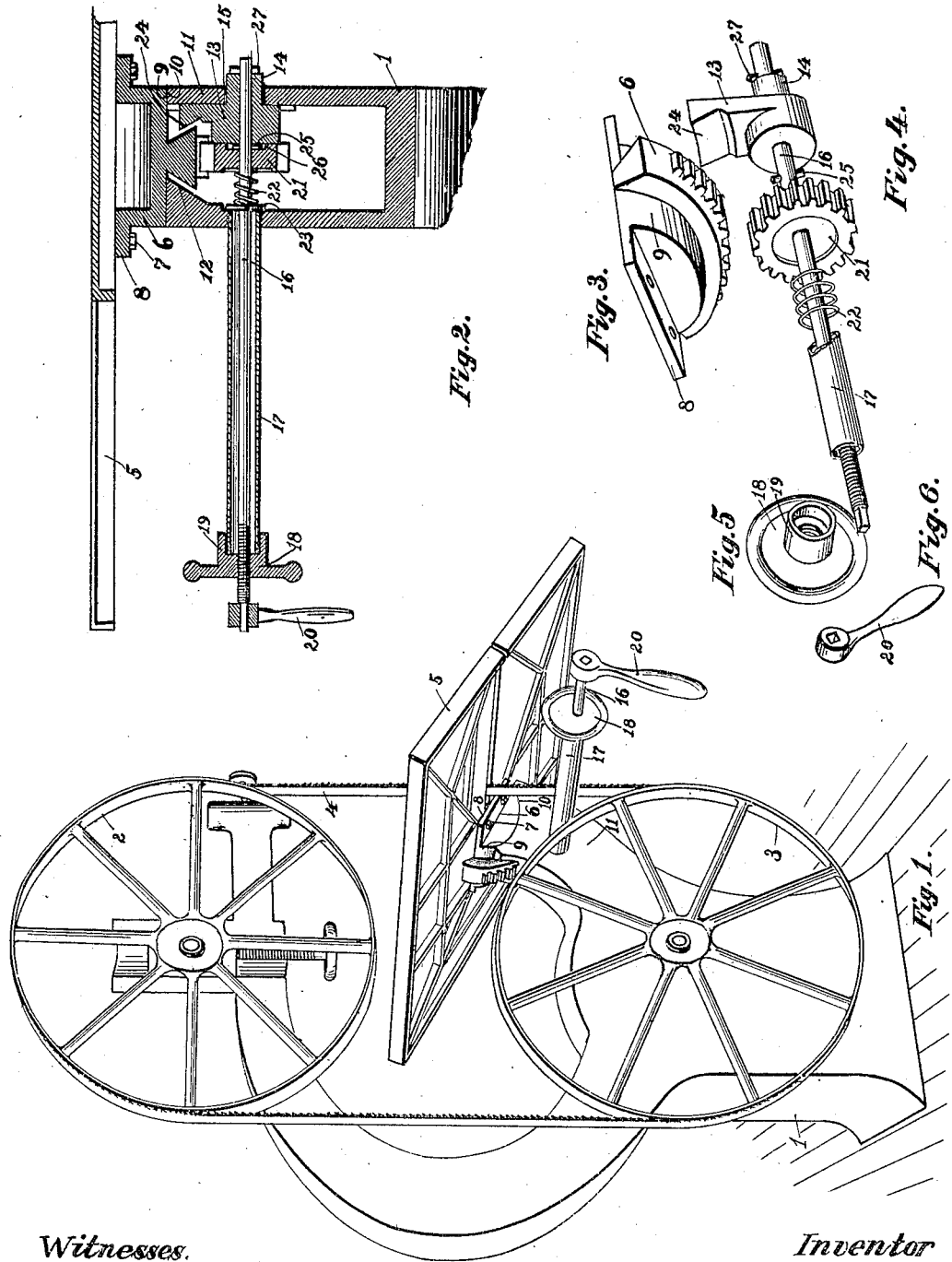
Witnesses.
Harry O. Rastetter
Sylvia Boron
Inventor
Charles F. Haldeman,
By F. W. Bond,
Attorney.

UNITED STATES PATENT OFFICE.

CHARLES F. HALDEMAN, OF SALEM, OHIO, ASSIGNOR TO THE SILVER MANUFACTURING COMPANY, OF SALEM, OHIO, A CORPORATION OF OHIO.

SAW-TABLE.

No. 844,590.    Specification of Letters Patent.    Patented Feb. 19, 1907.

Application filed October 19, 1906. Serial No. 339,588.

*To all whom it may concern:*

Be it known that I, CHARLES F. HALDEMAN, a citizen of the United States, residing at Salem, in the county of Columbiana and State of Ohio, have invented certain new and useful Improvements in Saw-Tables; and I do hereby declare that the following is a full, clear, and exact description of the same, reference being had to the accompanying drawings, making a part of this specification.

The object of the present invention is to provide a table for saws that can be set at an angle other than a right angle to the saw-blade.

Figure 1 is a perspective view of a band-saw frame and table, showing the table tilted at an angle other than a right angle to the saw-blade. Fig. 2 is a vertical section through the table and the mechanism for clamping the table and tilting the table. Fig. 3 is a detached perspective view of the toothed segment. Fig. 4 is a perspective view of the pinion-shaft its pinion showing the clamp-block located thereon, a portion of the shaft-holding tube, and the shaft-actuating spring. Fig. 5 is a detached view of the clamp hand-wheel. Fig. 6 is a detached view of the table-tilting crank.

Similar numerals of reference indicate corresponding parts in all the figures of the drawings.

In the accompanying drawings, 1 represents the frame, which in this instance is arranged for a band-saw, which frame carries the usual upper and lower wheels 2 and 3, and around which wheels is located the saw 4. These parts, however, are shown in the present instance for the purpose of illustrating the application of the present invention to a band-saw; but it will be understood that the mechanism for tilting the table at an angle to a horizontal line can be applied without reference to the particular construction of the mechanism pertaining to a band-saw or a reciprocating saw, except so far as to the arrangement of the parts designed to tilt the saw-table and to hold the saw-table at any angle to the saw. To the bottom or under side of the table 5 is securely attached the toothed segment 6 by means of suitable clamping-bolts 7, passed through the flanges 8. The toothed segment 6 is provided with the flanges 9, which flanges are seated in the concaved grooves 10. formed in the upper end of the arm 11. Said concaved grooves are for the purpose of forming suitable bearings for the toothed segment proper, the flanges 9 being formed to fit said concaved grooves, whereby a rocking movement can be imparted to the toothed segment 6, which in turn imparts a tilting movement to the table 5. The arm 11 is formed hollow, as illustrated in Fig. 2, and the inner upper face of said arm is provided with the inclined flange 12. Upon the opposite side of the arm 11 is located the movable clamping-block 13, which clamping-block is provided with the lateral lug or boss 14, which is passed through the aperture 15. The clamping-block 13 is located upon the shaft or rod 16, which shaft or rod is extended under the table 5, substantially as illustrated in the drawings, and for the purpose of holding the shaft in proper horizontal position and for the purpose hereinafter described the pipe 17 is provided, which pipe is securely attached, in any convenient and well-known manner, to the arm 11 and the shaft or rod 16 extended through and beyond said pipe 17. Upon the pipe 17 is located the hand-wheel 18, which hand-wheel is provided with the socket-flange 19, said socket-flange constituting a bearing for the hand-wheel 18. The shaft or rod 16 is screw-threaded for a short distance at the place where the hand-wheel is located, and the hand-wheel is provided with a screw-threaded aperture, through which the arm or shaft 16 passes.

It will be understood that by turning the hand-wheel in one direction the clamping-block will be moved toward the toothed segment 6, bringing said clamping-block into contact with the face of the toothed segment, and after said clamping-block has been brought into contact with said toothed segment said toothed segment, together with the table 5, will be moved in the direction toward the inclined flange 12, and by a further rotation of the hand-wheel 18 said segment will be clamped between the inclined flange 12 and the clamping-block 13, by which arrangement the toothed segment will be held against any movement and the table held in a firm position of any predetermined angle. When it is desired to change the angularity of the table, the toothed segment is released by rotating the hand-wheel in the opposite direction from that to clamp the segment, and when said toothed segment is released the rod or shaft 16 is rotated by the handle 20, which rotation imparts a rotary movement to the pinion 21, which pinion meshes with the toothed segment 6.

For the purpose of causing the pinion to move with the clamping-block when said clamping-block is moved to release the segment the spring 22 is provided, which spring is located around the shaft or rod 16 and between the pinion 21 and the plate 23, by which arrangement the pinion is always in proper mesh with the toothed segment 6, regardless of the position of the clamping-block 13.

For the purpose of holding the table upon the arm 11 when the toothed segment is released said toothed segment is formed wedge-shaped in cross-section and located between the inclined flange 12 and the clamping-block 13, said clamping-block being provided with an inclined flange 24. The upper portions of the inclined flange 12 and the inclined flange 24 are normally located above the lower or widest portion of the wedge-shaped flange or toothed segment 6.

It will be understood that by my peculiar arrangement I am enabled to hold the table in a rigid condition regardless of its adjustment within the limits of its tilting movement, and by providing the adjustment I am enabled to set the table at any desired angle, by which arrangement any desired bevel can be given to the material placed upon the table and operated upon by the saw and the angle of the bevel changed at will, thereby providing these bevels for different articles.

For the purpose of causing the pinion to rotate with the rotation of the shaft 16 the pin 25 is provided, which pin is fixed to the shaft 16 and seated in the groove 26, formed in the pinion 21, said pin being held in the groove at all times by means of the spring 22. It will, however, be understood that other ways may be provided for causing the pinion 21 to rotate with the shaft 16 without departing from the nature of my invention, as the only object is to provide some means for securely connecting the pinion to the shaft. In order that the clamping-block 13 may be drawn snugly against the adjacent face of the wedge-shaped flange of the toothed segment, the pin 27 or its equivalent is secured to the shaft 16.

Having fully described my invention, what I claim as new, and desire to secure by Letters Patent, is—

1. In a table for saws, a table provided with a toothed segment provided with a wedge-shaped flange, a fixed inclined flange located adjacent one face of the wedge-shaped flange of the toothed segment, a clamping-block provided with an inclined face, said clamping-block mounted upon a shaft and carried by the frame, means for imparting longitudinal movement to the shaft and the shaft provided with a pinion adapted to mesh with the toothed segment, and a spring adapted to move the shaft and clamping-block in position to release the table, substantially as and for the purpose specified.

2. In a table for saws, the combination of a saw-table and a saw-frame, an arm provided with concaved grooves and a clamping-flange, a toothed segment provided with flanges located upon opposite sides of the teeth of the segment, said flanges adapted to fit the concaved groove, a pinion adapted to mesh with the toothed segment, a tube secured to the arm, a hand-wheel loosely mounted upon the tube and provided with a screw-threaded aperture, a shaft located through the tube and provided with a screw-threaded portion, a pinion mounted upon the shaft and rotatable therewith, and adapted to mesh with the toothed segment, a combined bearing and clamping-block carried by the arm, said combined clamping-block and bearing slidably mounted in the arm and upon the shaft, and means for rotating the shaft, substantially as and for the purpose specified.

3. In a table for saws, the combination of a saw-table and a saw-frame, an arm provided with concaved grooves and a clamping-flange, a toothed segment provided with flanges located upon opposite sides of the teeth of the segment, said flanges adapted to fit the concaved groove, a pinion adapted to mesh with the toothed segment, a tube secured to the arm, a hand-wheel loosely mounted upon the tube and provided with a screw-threaded aperture, a shaft located through the tube and provided with a screw-threaded portion, a pinion mounted upon the shaft and rotatable therewith, and adapted to mesh with the toothed segment, a combined bearing and clamping-block carried by the arm, said combined clamping-block and bearing slidably mounted in the arm and upon the shaft, and means for rotating the shaft, and a spring adapted to release the toothed segment, substantially as and for the purpose specified.

In testimony that I claim the above I have hereunto subscribed my name in the presence of two witnesses.

CHARLES F. HALDEMAN.

Witnesses:
E. BEACHAM,
RALPH W. CAMPBELL.